United States Patent Office 3,763,227
Patented Oct. 2, 1973

3,763,227
NOVEL 3,5-SUBSTITUTED 2,4,6-TRIIODOBENZOIC ACIDS AND SALTS THEREOF
Björn Gustav-Adolf Ingelman, Uppsala, Sweden, assignor to Pharmacia AB, Uppsala, Sweden
No Drawing. Original application Dec. 26, 1968, Ser. No. 787,224, now Patent No. 3,632,737. Divided and this application July 21, 1970, Ser. No. 56,980
Int. Cl. C07c *103/32*
U.S. Cl. 260—490  22 Claims

ABSTRACT OF THE DISCLOSURE

Compounds of the formula:

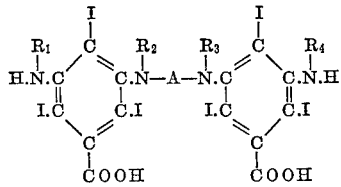

wherein $R_1$–$R_4$ are each lower acyl having no more than 5 carbon atoms and wherein A is an alkylene group substituted by at least one substituent of the formula —O—R, wherein R is a member selected from the group consisting of hydrogen, lower alkyl and acyl having no more than 5 carbon atoms, said alkylene group containing 3–20 carbon atoms, or physiologically acceptable salts thereof are provided. Such compounds are especially suitable to be used for X-ray visualization of body cavities.

RELATED CASES

This application is divisional application of copending U.S. patent application Ser. No. 787,224 filed Dec. 26, 1968 and now Pat. 3,632,737.

The present invention relates to novel 3,5-substituted 2,4,6-triiodobenzoic acids adapted to be used for the X-ray visualization of body cavities.

More particularly the present invention relates to compounds of the formula

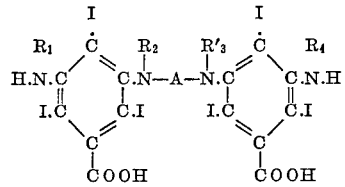

wherein $R_1$; $R_2$; $R_3$ and $R_4$ are each lower acyl having no more than 5 carbon atoms and wherein A is an alkylene group substituted by one or more substituents of the formula —O—R, wherein R is hydrogen or a lower alkyl or acyl group having no more than 5 carbon atoms, the alkylene group containing 3–20 (for example 3–15) carbon atoms and being optionally broken by one or more oxygen bridges, or physiologically acceptable salts thereof. $R_1$; $R_2$; $R_3$ and $R_4$ in the aforementioned formulae are normally the same; but can also be different.

In a preferred embodiment each nitrogen atom in the bridge

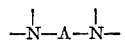

is situated at a distance of two carbon atoms from a group of the formula —O—R. Preferably at most one hetero atom is bound to one and the same carbon atom in the bridge A. (The phrase "a hetero atom" is used to designate an atom other than a carbon or hydrogen atom). The bridge A suitably contains 3–10 carbon atoms in the alkylene group.

Examples of substituents $R_1$–$R_4$ are acetyl, propionyl or butyryl. R is preferably selected in the form of hydrogen when hydrophilic compounds are desired. Consequently, in the majority of the fields of use R is preferably selected as a hydrogen atom. When compounds having more lipophilic properties are desired R is selected as a lower alkyl or acyl group, e.g. methyl or ethyl or acetyl or propionyl.

Examples of the bridge A in the aforementioned formulae are:

—CH₂.CH(OH).CH₂— or

—CH₂.CH(OH).CH₂.O.CH₂.CH(OH).CH₂— or

—CH₂.CH(OH).CH₂.O.CH₂.CH₂.O.CH₂.CH(OH).CH₂— or

—CH₂.CH(OH).CH₂.O.(CH₂)₄.O.CH₂.CH(OH).CH₂— or

—CH₂.CH(OH).CH₂.O.CH.CH₂.CH₂.O.CH₂CH(OH).CH₂—
                          |
                          CH₃ or

—CH₂.CH(OH).CH₂.O.CH₂.CH₂.O.
                            CH₂.CH₂.O.CH₂.CH(OH).CH₂— or

—CH₂.CH(OH).CH₂.O.CH₂.CH(OH).CH₂.O.CH₂.CH(OH).CH₂— or

—CH₂.CH(OH).CH(OH).CH₂— or

—CH₂.CH(OH).CH₂.O.CH₂.CH(OH).CH₂.O.(CH₂)₂.
                    O.CH₂.CH(OH).CH₂.O.CH₂.CH(OH).CH₂— or

—CH₂.CH(OH).CH₂.O.CH₂.CH(OH).CH₂.O.(CH₂)₄.
                    O.CH₂.CH(OH).CH₂.O.CH₂.CH(OH).CH₂— or any of the aforementioned bridges which have one or more hydroxyl groups alkylated or acylated with a lower alkyl or acyl group having no more than 5 carbon atoms, e.g. methyl or ethyl or acetyl or propionyl.

Examples of salts of the aforementioned compounds are sodium salts, methylglucamine salts, tris-hydroxylmethyl amino methane salts or other non-toxic salts. These can be used in the form of an aqueous solution.

Examples of such compounds are:

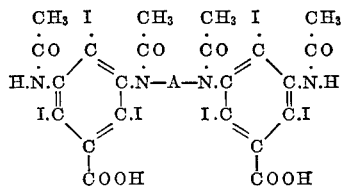

wherein A is

—CH₂.CH(OH).CH₂.O.(CH₂)₄.
                  O.CH₂.CH(OH).CH₂— or

—CH₂.CH(OH).CH₂.O.(CH₂)₂.
                  O.CH₂.CH(OH).CH₂— or

—CH₂.CH(OH).CH₂.O.CH₂.CH(OH).CH₂— or

—CH₂.CH(OH).CH₂.O.CH₂.CH(OH).CH₂.
                  O.CH₂.CH(OH).CH₂— or

—CH₂.CH(OH).CH(OH).CH₂— or

—CH₂.CH(OH).CH₂— or any of the aforementioned bridges in which one or more hydroxyl groups have been alkylated or acylated with a lower alkyl or acyl group having no more than 5 carbon atoms, e.g. methyl or ethyl or acetyl or propionyl, or physiologically acceptable salts thereof, e.g. sodium salts or methylglucamine salts.

The novel compounds are very useful as X-ray contrast agents. A preparation for carrying out X-ray investigations may suitably consist of a mixture, such as an aqueous solution, or contain a physiologically acceptable solid carrier, the preparation preferably being in tablet form or in the form of some other suitable dosage unit; said mixture containing one or more of the aforementioned compounds as active contrast-producing substances.

When applying a preparation containing a contrast-producing agent according to the invention the contrast-producing agent is administered to the body of the test object whereafter the body is exposed to X-rays and photographs may be taken or the image observed direct on a fluorescent screen, or other X-ray technics may be applied in a conventional manner. The dose of contrast-producing agent administered is selected according to the category of the investigation, so that a sufficient contrast effect is obtained.

One example of the different body cavities which can be visibilized by means of the compounds according to the invention or by preparations containing one or more of said compounds is the gastrointestinal tract. In this instance, the contrast-producing agent is administered perorally in solid or solution form. The intestines can also be visibilized by administering the contrast-producing agent rectally in the form of an enema. Another example is the visualization of blood vessels subsequent to the contrast-producing agent being injected in the form of a sterile solution. When injected intraveneously the contrast-producing agent is excreted with the urine and enables visibilization of the renal pelvis, ureters and bladders. Further examples are the use of the novel compounds in hysterosalpingography, cholangiography, lymphography, urethrography and sialography.

The novel compounds according to the invention have a low toxicity, e.g. when they are administered intravenously, and present excellent characteristics as X-ray contrast-producing agents.

Carriers for the novel compounds may be conventional additive substances, such as water with regard to injection solutions and adjuvants when in tablet form.

If the preparation containing a compound according to the invention is in the form of an aqueous solution the concentration of the active compounds is selected in accordance with the field of use. Preferably, a content exceeding 10 grams per 100 ml. of solution is chosen. Normally, however, an appreciably higher content is chosen, e.g. in the order of 20, 30, 40 or 50 grams or more per 100 ml. of solution.

The above described novel 3,5-substituted 2,4,6-triiodobenzoic acids can be prepared, for instance, by reacting a compound of the formula

Y.A.X wherein A has the significance as set forth above, R preferably being hydrogen, and wherein Y and X are each halogen, preferably chloro or bromo, or corresponding epoxide compounds obtainable from the compound Y.A.X by splitting off hydrogen halide, with 1 mole of a compound of the formula

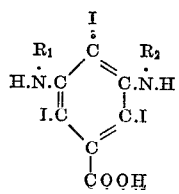

wherein $R_1$ and $R_2$ have each the above significance, or salts thereof, and with 1 mole of compounds of the formula

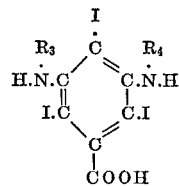

wherein $R_3$ and $R_4$ have each the aforegiven significance, or salts thereof. If $R_1$ is identical with $R_2$, $R_3$ and $R_4$, which is usually the case, this means that the compound Y.A.X. is reacted with 2 moles of a compound of the formula

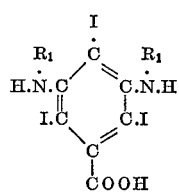

wherein $R_1$ has the above significance, or salts thereof. If $R_1$ is identical with $R_4$ and $R_2$ with $R_3$ then the compound of the formula Y.A.X. is reacted with 2 moles of a compound of the formula

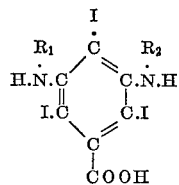

wherein $R_1$ and $R_2$ each have the above significance, or salts thereof.

Since the iodo monomers (the 3-acylamino-5-acylamino-2,4,6-triiodobenzoic acids) in this instance have two reactive hydrogen atoms, which can react with the bifunctional bridge formers which give rise to the bridges —A— in the dimers, it is naturally suitable to employ, during the reactions, an excess of the iodo monomers in relation to the bridge formers to avoid formation of more highly polymerized products. The dimers obtained from the reaction products (dicarboxylic acids or salts thereof) and the monomers (monocarboxylic acids or salts thereof) can be isolated through their different solubility characteristics or by other conventional fractionating methods. The excess of iodo monomers can thus be recovered and reused in the next production step. The reactions are thus suitably conducted to avoid a higher degree of polymerization, so that it is not necessary to fractionate the dimers from products having higher polymerization degrees. Such fractionating, however, is possible with conventional fractionating methods. Monomers and possibly minor quantities of trimers etc. need not be removed from the dimers since both the monomers and the trimers etc. are acceptable.

To avoid polymerization to higher degrees of polymerization than dimers when using larger quantities of bridge formers it is possible to arrange that the iodo monomers instead of containing acylamino groups in 5-position have groups which do not contain any reactive hydrogen atom which reacts with the bridge former, said groups being converted into acylamino groups only after being dimerized with bifunctional bridge formers. However, as previously mentioned, the excess of the iodomonomers can be recovered and reused in the next batch, and consequently it is unnecessary to apply such a troublesome method.

The obtained compounds are recovered either as dicarboxylic acids or in the form of physiologically acceptable salts.

Examples of such salts are sodium salts or methylglucamine salts. Sodium and methylglucamine salts have good solubility in water.

Examples of the bifunctional compounds of the type Y.A.X. or corresponding epoxide compounds obtainable from Y.A.X. by splitting off hydrogen halide are:

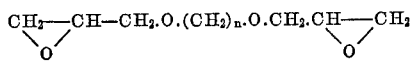

wherein $n$ is an integer from 2 to 4, and

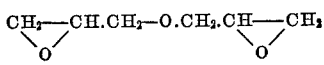

and

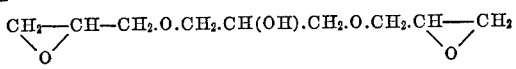

or corresponding halogen hydrins, and bifunctional glycerine derivatives of the formula $$X.CH_2.CH(OH).CH_2—Y,$$

e.g. dichlorohydrin and dibromohydrin, or corresponding epoxy compounds obtainable by splitting off hydrogen halide and having the formula

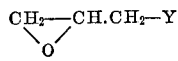

e.g. epichlorohydrin and epibromohydrin. Another example of such a bifunctional compound is 1,2–3,4-diepoxybutane.

The reaction is preferably carried out in a solvent, e.g. water or an aqueous liquid, and there is suitably added an alkaline reacting substance, e.g. alkalimetal hydroxides, the alkaline substance acting as a catalyst. Thus, the alkaline substance may also function as an acceptor for any hydrogen halide liberated during the reaction.

If it is desired to convert one or more hydroxyl groups in the bridge to alkylated or acylated hydroxyl groups the obtained compounds are treated with an alkylating agent or acylating agent, e.g. dimethylsulphate or acetic acid anhydride, in a conventional manner for alkylating or acylating hydroxyl groups.

The reaction can be carried out at different temperatures, e.g. between 0 and 50° C., such as 20° C.

EXAMPLE 1

0.1 mole of 3-acetylamino-5-acetylamino-2,4,6-triiodobenzoic acid was dissolved in 50 ml. of an aqueous 4 N solution of sodium hydroxide. 0.02 mole of bis[2,3-epoxypropyl]-ether was slowly added to the solution dropwise at 20° C. whilst stirring. The reaction mixture was then allowed to stand for 1 day at 20° C., whereafter 6 N HCl was added in an amount sufficient to precipitate the dicarboxylic acid formed in the reaction and the excess of monocarboxylic acid. The product was cleansed by washing with water and precipitation, and dried in vacuum at 50° C. The yield of raw product (containing dicarboxylic acid and monocarboxylic acid) was about 55–60 grams. Dicarboxylic acid was isolated from the raw product, e.g. by fractioning with methanol.

Solutions can be prepared from the resulting dicarboxylic acid by adding water and e.g. equivalent amounts of sodium hydroxide or methylglucamine.

EXAMPLE 2

0.1 mole of 3-acetylamino-5-acetylamino - 2,4,6 - triiodobenzoic acid was dissolved in 50 ml. of an aqueous solution 4 N of sodium hydroxide. 0.02 mole of 1,2-ethanedioldiglycide ether was added slowly to the solution dropwise at 20° C. whilst stirring. The reaction mixture was then allowed to stand for 1 day at 20° C., whereafter 6 N HCl was added in an amount sufficient to precipitate the dicarboxylic acid formed in the reaction and the excess of monocarboxylic acid. The product was cleansed by washing with water and further precipitation, and was dried in vacuum at 50° C. The yield of the raw product (containing dicarboxylic acid and monocarboxylic acid) was about 55–60 grams. The dicarboxylic acid was isolated from the raw product, e.g. by fractioning with methanol.

Solutions can be prepared from the obtained dicarboxylic acid by adding water and, e.g. equivalent quantities of sodium hydroxide or methylglucamine.

EXAMPLE 3

0.1 mole of 3-acetylamino-5-acetylamino-2,4,6-triiodobenzoic acid was dissolved in 50 ml. of an aqueous 4 N solution of sodium hydroxide. 0.02 mole of 1,4-butanedioldiglycide ether was added slowly to the mixture dropwise at 20° C. whilst stirring. The reaction mixture was then allowed to stand for 1 day at 20° C. whereafter 6 N HCl was added in an amount sufficient to precipitate the dicarboxylic acid formed in the reaction and the excess of the monocarboxylic acid. The product was purified by washing and further precipitation, and was dried in vacuum at 50° C. The yield of the raw product (containing dicarboxylic acid and monocarboxylic acid) was about 55–60 grams. The dicarboxylic acid was isolated from the raw product, e.g. by fractioning with methanol.

The obtained dicarboxylic acid can be converted into salts, from which aqueous solutions can be prepared as in Example 1 and Example 2.

EXAMPLE 4

In a manner similar to that disclosed in Example 1, 0.1 mole of 3-acetylamino-5-acetylamino - 2,4,6 - triiodobenzoic acid was reacted with 0.02 mole of epichlorohydrin or with 0.02 mole of epibromohydrin or with 0.02 mole of dichlorohydrin.

Cleansing of the dicarboxylic acid formed in the reaction was effected in a manner similar to that set forth in Example 1.

EXAMPLE 5

Solutions were prepared from the dicarboxylic acids obtained from each of the Examples 1, 2, 3 and 4 in the following manner: 40 grams of substance and equivalent quantities of methylglucamine were dissolved in water to a solution volume of 100 ml. pH was adjusted to 7.3–7.4. The solution was filtered and poured into bottles, which were closed and sterilized in an autoclave.

EXAMPLE 6

The solutions from Example 5 were injected into the blood vessels of rabbits, whereupon the blood vessels could be visibilized by X-rays and photographs.

X-ray exposure of the stomach area and subsequent photographs showed filling of the contrast-producing agent in the urineal ducts.

EXAMPLE 7

Solutions from Example 5 were administered orally to rabbits, whereafter the gastro-intestinal duct could be visibilized by X-rays and photographs with good results.

EXAMPLE 8

Solutions of sodium salt of the compound prepared in a similar manner as that disclosed in Example 5 and containing 20 grams of dicarboxylic acid per 100 ml. of solution were administered rectally to rabbits in the form of an enema, whereafter the intestines could be visibilized by X-ray and photographs with good results.

What I claim is:

1. A compound selected from the group consisting of (1) compounds of the formula

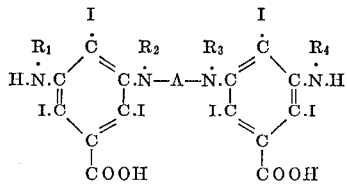

wherein R₁–R₄ are each lower alkanoyl having no more than 5 carbon atoms and wherein A is an alkylene group substituted by at least one substituent of the formula —O—R, wherein R is a member selected from the group consisting of hydrogen, lower alkyl having no more than 5 carbon atoms and alkanoyl having no more than 5 carbon atoms, said alkylene group containing 3–20 carbon atoms, and (2) physiologically acceptable salts thereof.

2. A compound as claimed in claim 1, wherein each nitrogen atom in the bridge

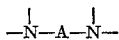

is situated at a distance of two carbon atoms from a group —O—R and wherein at the most one hetero atom is bound to one and the same carbon atom in the bridge A.

3. A compound as claimed in claim 1, wherein the bridge A is a member selected from the group consisting of

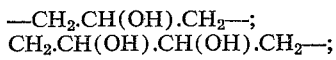

and the aforesaid bridges in which at least one hydroxyl group is alkylated with lower alkyl having no more than 5 carbon atoms.

4. A compound as claimed in claim 1, wherein the bridge A is a member selected from the group consisting of

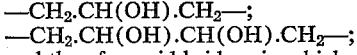

and the aforesaid bridges in which at least one hydroxyl group is acylated with lower alkanoyl having no more than 5 carbon atoms.

5. A compound as claimed in claim 1, wherein R₁–R₄ are each a member selected from the group consisting of acetyl; propionyl; and butyryl and R is a member selected from the group consisting of hydrogen; methyl; ethyl; acetyl; and propionyl.

6. The compound of claim 1 wherein R₁, R₂, R₃ and R₄ are each acetyl and —O—R is —OH.

7. A compound selected from the group consisting of (1) compounds of the formula

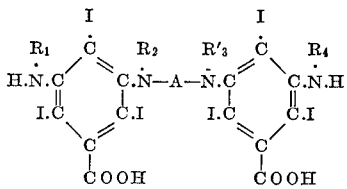

wherein R₁–R₄ are each lower alkanoyl having no more than 5 carbon atoms and wherein A is an alkylene group substituted by at least one substituent of the formula —O—R, wherein R is a member selected from the group consisting of hydrogen, lower alkyl having no more than 5 carbon atoms and alkanoyl having no more than 5 carbon atoms, said alkylene group containing 3–20 carbon atoms and being broken by at least one oxygen bridge, and (2) physiologically acceptable salts thereof.

8. A compound as claimed in claim 7, wherein each nitrogen atom in the bridge —N—A—N— is situated at a distance of two carbon atoms from a group —O—R and wherein at the most one hetero atom is bound to one and the same carbon atom in the bridge A.

9. A compound as claimed in claim 7, wherein the bridge A is a member selected from the group consisting of

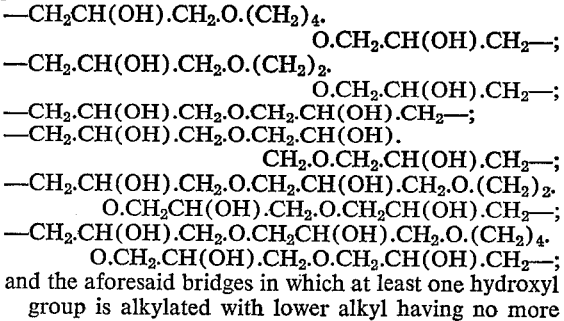

and the aforesaid bridges in which at least one hydroxyl group is alkylated with lower alkyl having no more than 5 carbon atoms.

10. A compound as claimed in claim 7, wherein the bridge A is a member selected from the group consisting of

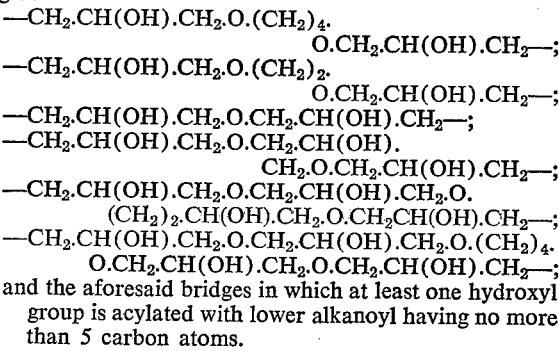

and the aforesaid bridges in which at least one hydroxyl group is acylated with lower alkanoyl having no more than 5 carbon atoms.

11. A compound as claimed in claim 7, wherein the substituents R₁–R₄ are each a member selected from the group consisting of acetyl; propionyl; and butyryl and R is a member selected from the group consisting of hydrogen, methyl, ethyl, acetyl, and propionyl.

12. The compound of claim 7 wherein R₁, R₂, R₃ and R₄ are each acetyl and —O—R is —OH.

13. A compound selected from the group consisting of (1) compounds of the formula

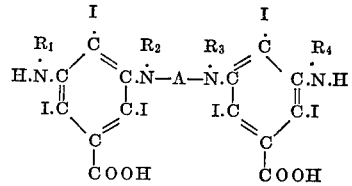

wherein R₁–R₄ are each lower alkanoyl having no more than 5 carbon atoms and wherein A is an alkylene group substituted by at least one substituent of the formula —O—R, wherein R is a member selected from the group consisting of hydrogen, lower alkyl having no more than 5 carbon atoms and alkanoyl having no more than 5 carbon atoms, said alkylene group containing 3–10 carbon atoms, and (2) physiologically acceptable salts thereof.

14. A compound as claimed in claim 13, wherein each nitrogen atom in the bridge

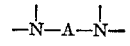

is situated at a distance of two carbon atoms from a group —O—R and wherein at the most one hetero atom is bound to one and the same carbon atom in the bridge A.

15. A compound as claimed in claim 13, wherein R₁–R₄ are each a member selected from the group consisting of acetyl; propionyl; and butyryl and R is a member selected from the group consisting of hydrogen, methyl, ethyl, acetyl and propionyl.

16. The compound of claim 13 wherein R₁, R₂, R₃ and R₄ are each acetyl and —O—R is —OH.

17. A compound selected from the group consisting of (1) compounds of the formula

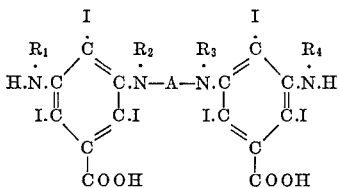

wherein $R_1$–$R_4$ are each lower alkanoyl having no more than 5 carbon atoms and wherein A is an alkylene group substituted by at least one substituent of the formula —O—R, wherein R is a member selected from the group consisting of hydrogen, lower alkyl having no more than 5 carbon atoms, and alkanoyl having no more than 5 carbon atoms, said alkylene group containing 3–10 carbon atoms and being broken by at least one oxygen bridge, and (2) physiologically acceptable salts thereof.

18. A compound as claimed in claim 17, wherein each nitrogen atom in the bridge

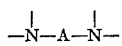

is situated at a distance of two carbon atoms from a group —O—R, and wherein at the most one hetero atom is bound to one and the same carbon atom in the bridge A.

19. A compound as claimed in claim 17, wherein the bridge A is a member selected from the group consisting of

—CH$_2$.CH(OH).CH$_2$.O.(CH$_2$)$_4$.O.CH$_2$.CH(OH).CH$_2$—;

—CH$_2$.CH(OH).CH$_2$.O.(CH$_2$)$_2$.O.CH$_2$.CH(OH).CH$_2$—;

—CH$_2$.CH(OH).CH$_2$.O.CH$_2$.CH(OH).CH$_2$—;

—CH$_2$.CH(OH).CH$_2$.O.CH$_2$.CH(OH).CH$_2$.O.CH$_2$.CH(OH).CH$_2$—;

and the aforesaid bridges in which at least one hydroxyl group is alkylated with lower alkyl having no more than 5 carbon atoms.

20. A compound as claimed in claim 17, wherein the bridge A is a member selected from the group consisting of

—CH$_2$.CH(OH).CH$_2$.O.(CH$_2$)$_4$.O.CH$_2$.CH(OH).CH$_2$—;

—CH$_2$.CH(OH).CH$_2$.O.(CH$_2$)$_2$.O.CH$_2$.CH(OH).CH$_2$—;

—CH$_2$.CH(OH).CH$_2$.O.CH$_2$.CH(OH).CH$_2$—;

—CH$_2$.CH(OH).CH$_2$.O.CH$_2$.CH(OH).CH$_2$.O.CH$_2$.CH(OH).CH$_2$—;

and the aforesaid bridges in which at least one hydroxyl group is acylated with lower alkanol having no more than 5 carbon atoms.

21. A compound as claimed in claim 17, wherein $R_1$–$R_4$ are each a member selected from the group consisting of acetyl; propionyl; and butyryl and R is a member selected from the group consisting of hydrogen, methyl, ethyl, acetyl, and propionyl.

22. The compound of claim 17 wherein $R_1$, $R_2$, $R_3$ and $R_4$ are each acetyl and —O—R is —OH.

References Cited
UNITED STATES PATENTS
3,541,141  11/1970  Bernstein et al. _____ 260—519

LORRAINE A. WEINBERGER, Primary Examiner

L. A. THAXTON, Assistant Examiner

U.S. Cl. X.R.

260—501.11, 519; 424—5

UNITED STATES PATENT OFFICE
CERTIFICATE OF CORRECTION

Patent No. 3,763,227            Dated October 2, 1973

Inventor(s) INGELMAN

It is certified that error appears in the above-identified patent and that said Letters Patent are hereby corrected as shown below:

Please correct the errors occurring in column 1 in the formula as shown in red below:

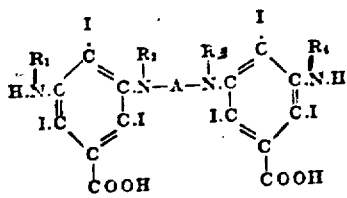

In column 7, Claim 3, line 5 insert a dash "-" before the formula "$CH_2.CH(OH).CH(OH).CH_2 \text{—};$".

In column 10, Claim 20, next to the last line, change "alkanol" to --- alkanoyl---.

Signed and sealed this 6th day of August 1974.

(SEAL)
Attest:

McCOY M. GIBSON, JR.
Attesting Officer

C. MARSHALL DANN
Commissioner of Patents